United States Patent
Xu et al.

(10) Patent No.: US 9,337,923 B2
(45) Date of Patent: May 10, 2016

(54) OPTICAL SPECTRAL SHAPING FOR NONLINEARITY ENHANCEMENT IN HIGH SPEED DIGITAL COHERENT OPTICAL TRANSMISSIONS

(71) Applicants: NEC Laboratories America, Inc., Princeton, NJ (US); NEC Corporation, Tokyo (JP)

(72) Inventors: Lei Xu, Princeton Junction, NJ (US); Shaoliang Zhang, Plainsboro, NJ (US); Fatih Yaman, Monmouth Junction, NJ (US); Ting Wang, West Windsor, NJ (US); Yoshihisa Inada, Tokyo (JP); Takaaki Ogata, Tokyo (JP); Yasuhiro Aoki, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 13/654,960

(22) Filed: Oct. 18, 2012

(65) Prior Publication Data
US 2013/0094851 A1   Apr. 18, 2013

Related U.S. Application Data

(60) Provisional application No. 61/548,315, filed on Oct. 18, 2011.

(51) Int. Cl.
| | | |
|---|---|---|
| *H04B 10/12* | (2006.01) | |
| *H04B 10/00* | (2013.01) | |
| *H04B 10/04* | (2006.01) | |
| *H04B 10/079* | (2013.01) | |
| *H04B 10/2507* | (2013.01) | |
| *H04B 10/07* | (2013.01) | |
| *H04B 10/2543* | (2013.01) | |

(52) U.S. Cl.
CPC .......... *H04B 10/07957* (2013.01); *H04B 10/07* (2013.01); *H04B 10/07953* (2013.01); *H04B 10/2543* (2013.01); *H04B 10/25073* (2013.01); *H04B 10/2507* (2013.01); *H04B 2210/254* (2013.01)

(58) Field of Classification Search
None
See application file for complete search history.

(56) References Cited

U.S. PATENT DOCUMENTS

| | | | | |
|---|---|---|---|---|
| 6,807,376 B2 * | 10/2004 | Shimojoh | ........... | H01S 3/10023 398/149 |
| 7,385,754 B2 * | 6/2008 | Ghera | ..................... | H04J 14/02 359/337.1 |

(Continued)

OTHER PUBLICATIONS

Twelfth Annual Conference on European Fibre Optic Communications and Networks: Proceedings Papers on Optical Communication Systems and Optical Acess Networks, The European Institute for Communicaitons and Networks, 1994, p. 52.*

(Continued)

*Primary Examiner* — Ken N Vanderpuye
*Assistant Examiner* — Jai Lee
(74) *Attorney, Agent, or Firm* — Joseph Kolodka

(57) ABSTRACT

A method includes evaluating an optical signal spectrum for estimated filtering parameters of an optical spectral filtering device for shaping optical signal spectrum, determining a feedback for fine tuning the optical spectral filtering device for nonlinearity tolerance enhancement in the optical transmission system, responsive to received optical signal quality in the optical signal spectrum; and using the feedback to adjust said optical spectral filtering device for predetermined shaping and predetermined fiber nonlinearity tolerance in the optical transmission system.

14 Claims, 3 Drawing Sheets

(56) References Cited

U.S. PATENT DOCUMENTS

| | | | | |
|---|---|---|---|---|
| 8,326,153 B2* | 12/2012 | Sheng | ............... | H04B 10/2513 398/147 |
| 8,331,786 B2* | 12/2012 | Hashimoto | ........ | H04B 10/5165 385/123 |
| 8,374,514 B2* | 2/2013 | Huang | .................. | H04B 10/60 398/163 |
| 2002/0191904 A1* | 12/2002 | Kani et al. | ...................... | 385/24 |
| 2004/0161242 A1* | 8/2004 | Xu | ...................... | H04B 10/077 398/149 |
| 2004/0228564 A1* | 11/2004 | Gunn | ................. | G02B 6/12004 385/1 |
| 2009/0067843 A1* | 3/2009 | Way | ..................... | H04B 10/506 398/79 |
| 2010/0232803 A1* | 9/2010 | Ji | ......................... | H04B 10/677 398/149 |

OTHER PUBLICATIONS

Weik, Martin., Fiber Optics Standard Dictionary, 1997, Chapman & Hall, 3rd ed., p. 950.*

* cited by examiner

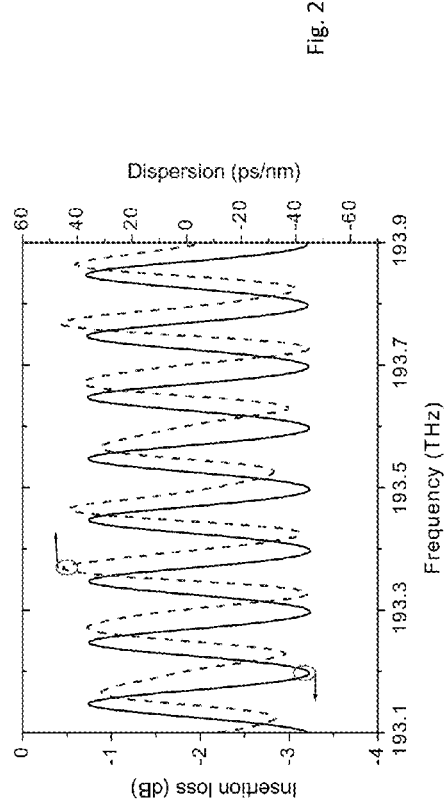
Fig. 2
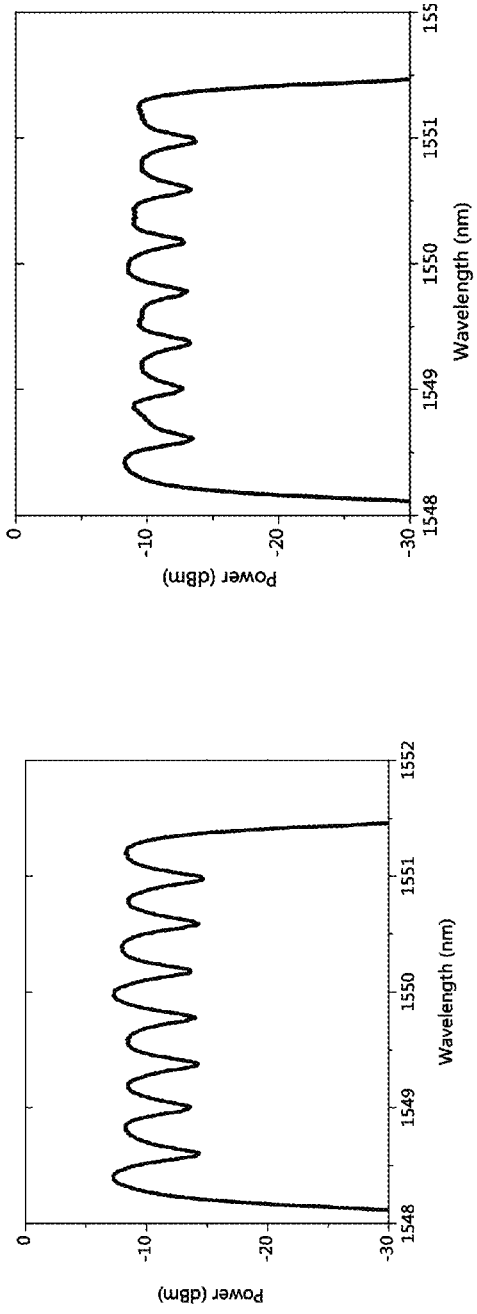
Fig. 3 (a)
Fig. 3(b)

US 9,337,923 B2

OPTICAL SPECTRAL SHAPING FOR NONLINEARITY ENHANCEMENT IN HIGH SPEED DIGITAL COHERENT OPTICAL TRANSMISSIONS

RELATED APPLICATION INFORMATION

This application claims priority to both provisional application No. 61/548,315 filed Oct. 18, 2011, the contents thereof are incorporated herein by reference

BACKGROUND OF THE INVENTION

The present invention relates generally to optical communications, and more particularly, to optical spectral shaping for nonlinearity enhancement in high speed digital coherent optical transmission.

Coherent optical communication has triggered the intensive research in improving system capacity, transmission distance and spectral efficiency by using high-order modulation formats and advanced digital signal processing (DSP) techniques. Among the various modulation formats, dual-polarization (DP) quadrature phase shift-keying (QPSK) is one of the popular candidates for upgrading system capacity at 100 Gb/s per channel with trans-oceanic transmission reach [1]. Instead of laying new dispersion uncompensated fiber links (which have the optimal dispersion map for digital coherent transmission systems), it is highly desirable to upgrade the widely deployed dispersion managed fiber (DMF) links to 100 Gb/s and beyond to reduce the system cost and increase the network data capacity. However, one of the challenges in digital coherent transmission over DMF links is caused by the its chromatic dispersion (CD) map, which was designed to have full CD compensation by using dispersion-compensated fiber (DCF) for analog receivers. This type of dispersion map would bring two critical issues when upgrading such system to 100G using coherent receivers: the small effective area of DCF (~25-40 $\mu m^2$) brings strong self-phase modulation (SPM) effects; the dispersion map does not provide large walking-off between neighboring WDM channels, thus enhancing the cross-phase modulation (XPM) impact. As a result, the 100G upgrade over legacy DMF fiber is a very challenging yet beneficial project for both system providers and network carriers.

With the aid of coherent receivers, enhanced DSP algorithms have been proposed to compensate for linear distortions and even fiber nonlinearity, such as SPM and XPM. Recent demonstration has shown 1.7 dB Q-factor improvement using SPM compensation and maximum likelihood sequence estimation. Compared with new advanced DSP algorithms, which generally require high investment for developing new ASIC chips, innovative optics solutions can be more attractive. In this paper, we propose to use low cost multi-channel optical spectral shaping device for enhancement of the fiber nonlinearity tolerance of 100G DP-QPSK transmission over legacy DMF fibers.

Optical fiber nonlinearity is one of the major limiting factors for high-speed optical communications. In the past, various measures have been proposed to improve the optical transmission system tolerance to fiber nonlinearity. As for digital coherent optical communication systems, some of the prior research efforts include the following outputs:

Since digital coherent receivers can have high tolerance to fiber chromatic dispersion, one approach is to adopt dispersion uncompensated link for high-speed optical transmission systems, and all the residual dispersion is compensated by the electronic digital signal processing (DSP) units at the receiver end. For example, an optical link consists of uncompensated standard single mode fiber (SMF-28) with dispersion at ~18 ps/nm/km. However, in transoceanic optical cable communications, very large dispersion can be accumulated and go beyond the dispersion compensation capabilities of the digital coherent receiver. Therefore, dispersion managed fiber links, which can manage the total residual dispersion, are more practical and popular for undersea optical cable communication systems. As pointed in session A1, dispersion managed fiber links generally incur large fiber nonlinearity to the optical signals.

In a digital coherent optical communication system, fiber nonlinearity has been shown to be compensated through high-speed DSP processing. One fiber nonlinearity compensation algorithm is known as "back propagation" algorithm, in which the received signal is back-propagated thorough the transmission line using DSP processing. Due to the lack of the analog solution to the Nonlinear Schrodinger Equation describing the optical signal propagation in optical fiber, the back propagation algorithms virtually solve the Nonlinear Schrodinger Equation wither reverse signs numerically. The existing nonlinearity compensation algorithms are generally demanding on computation resource and requires high investment for building new ASIC chips.

Accordingly there is a need for improved optical spectral shaping for nonlinearity enhancement in high speed digital coherent optical transmission

BRIEF SUMMARY OF THE INVENTION

The present invention is directed to a method for using an optical spectral shaping to improve optical power distribution in spectra for enhanced fiber nonlinearity tolerance in an optical transmission system. The method includes evaluating an optical signal spectrum for estimated filtering parameters of an optical spectral filtering device for shaping optical signal spectrum, determining a feedback for fine tuning the optical spectral filtering device for nonlinearity tolerance enhancement in the optical transmission system, responsive to received optical signal quality in the optical signal spectrum; and using the feedback to adjust said optical spectral filtering device for predetermined shaping and predetermined fiber nonlinearity tolerance in the optical transmission system.

These and other advantages of the invention will be apparent to those of ordinary skill in the art by reference to the following detailed description and the accompanying drawings.

BRIEF DESCRIPTION OF THE DRAWINGS

FIG. 2 shows an example of optical spectral filtering for improved fiber nonlinearity tolerance;

FIG. 3 shows spectra of 8WDM channels with optical spectral shaping at (a) 5.4 dB and (b) 9.5 dB center notch depth (optical spectral analyzer resolution @0.2 mm), in accordance with the invention.

DETAILED DESCRIPTION

The present invention is directed to a method for optical spectral shaping to enhance the optical system tolerance to fiber nonlinearity. Through optical spectral shaping, the total optical power is better distributed evenly among the signal spectrum. In many cases, the low frequency part of the optical spectra is generally suppressed and the relative intensity of the high-frequency components is increased. With evenly distributed optical power among the different spectral components, the fiber nonlinear effects can be suppressed.

Figure 1:
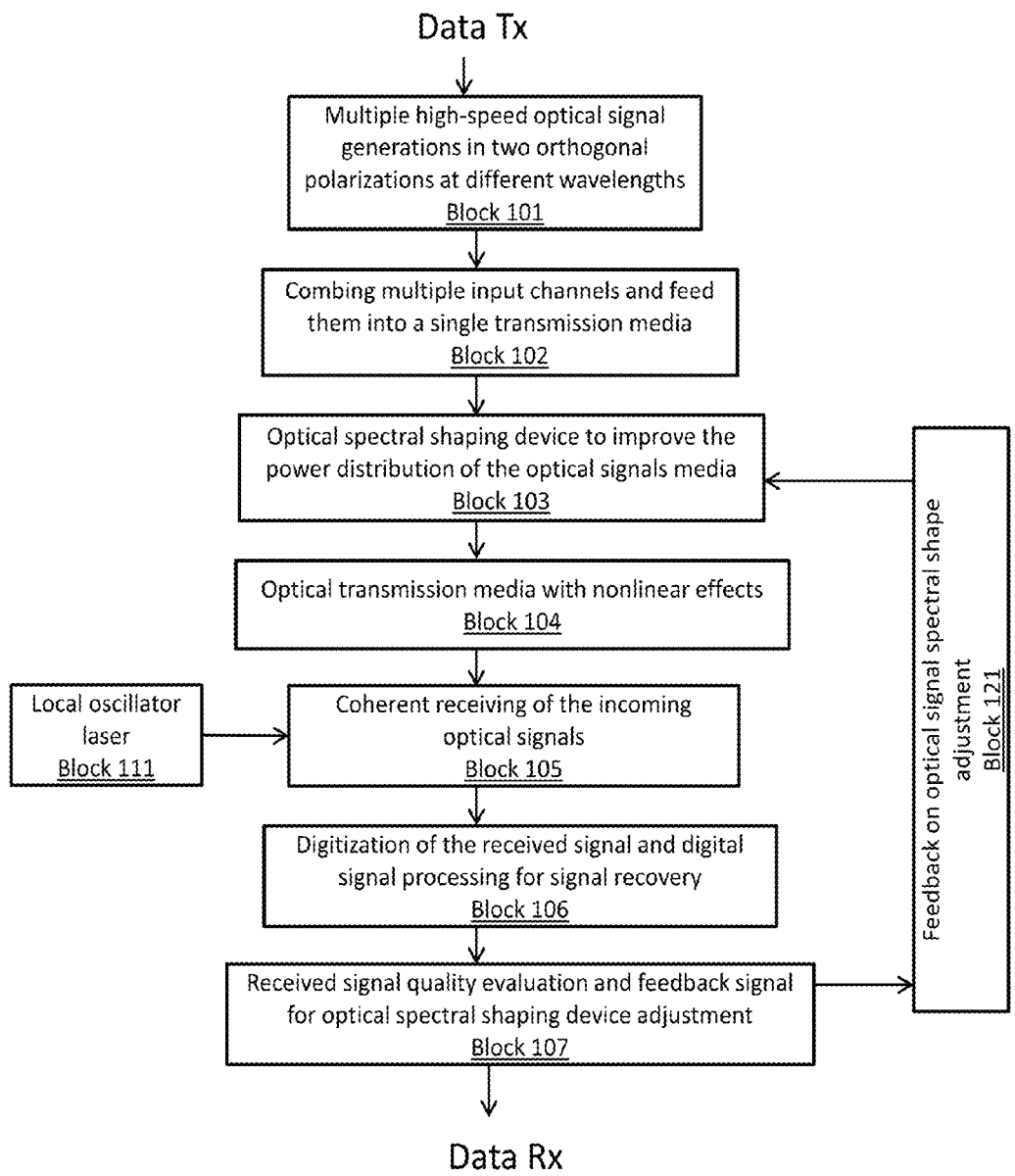
FIG. 1 shows an exemplary system application of optical spectral shaping for enhancing optical transmission system tolerance to fiber non-linearity, in accordance with the invention.

FIG. 1 shows the system application of optical spectral shaping for enhancing the optical transmission system tolerance to fiber nonlinearity. The optical signal can be generated using different modulation and multiplexing schemes, including polarization multiplexed quadrature phase shift keying (DP-QPSK) modulation. The generated optical signals at different wavelengths are combined and transmit through a single piece of optical fiber. Afterwards, an optical spectral shaping device is used to reshape the optical signal spectra to improve the power distribution for enhancement of fiber nonlinearity.

Data for transmission (Data Tx) under the inventive method starts with multiple high-speed generations in two orthogonal polarizations at different wavelengths 101. The multiple input channels are combined and fed into a single transmission media 102. An optical spectral shaping device is used to improve the power distribution of the optical signals media 103. Optical spectral shaping is a general term used to describe the manipulation of optical signal spectrum for a certain purposes. Previously, optical spectral shaping was used for optimal spectral shape for higher optical spectral efficiency, by squeezing high-speed optical signal into a narrow spectral band. With e present invention, it is shown that optical spectral shaping can improve the optical power distribution among the optical spectral components to enhance the fiber nonlinearity tolerance.

Returning to FIG. 1, the resulting optical transmission media exhibits non-linear effects 104. A local oscillator 111 enables coherent receiving of the incoming optical signals 105. Digitization of the received signal and digital signal processing is applied for signal recovery 106. Received signal quality is evaluated for a feedback signal for adjustment of the optical spectral shaping device 107. The feedback signal for optical spectral shaping 121 is looped back to the optical spectral shaping device 103. When the quality of the received signal is satisfactory, the data reception RX continues.

FIG. 2 shows one example of optical spectral shape filtering according to the invention, which can be used to enhance the optical transmission system nonlinearity tolerance. Its periodic filtering enables the device to support multiple channels simultaneously. Using a shaping device according to the wave pattern of FIG. 2 and adjusting the filtering notch depth, one can change the optical power distribution among the different optical signal spectral components, as shown in FIG. 3.

The wave patterns of FIG. 3 show the optical spectra of 8 WDM (wavelength division multiplexing) channels. Using a large notch depth, the per-channel optical spectral width is broadened when comparing FIG. 3 (a) and (b). For the same optical signal, a broadened spectrum can result in a more even distribution of optical signal power among the different spectral components, which can improve the optical signal tolerance to fiber nonlinearity.

Figure 4:
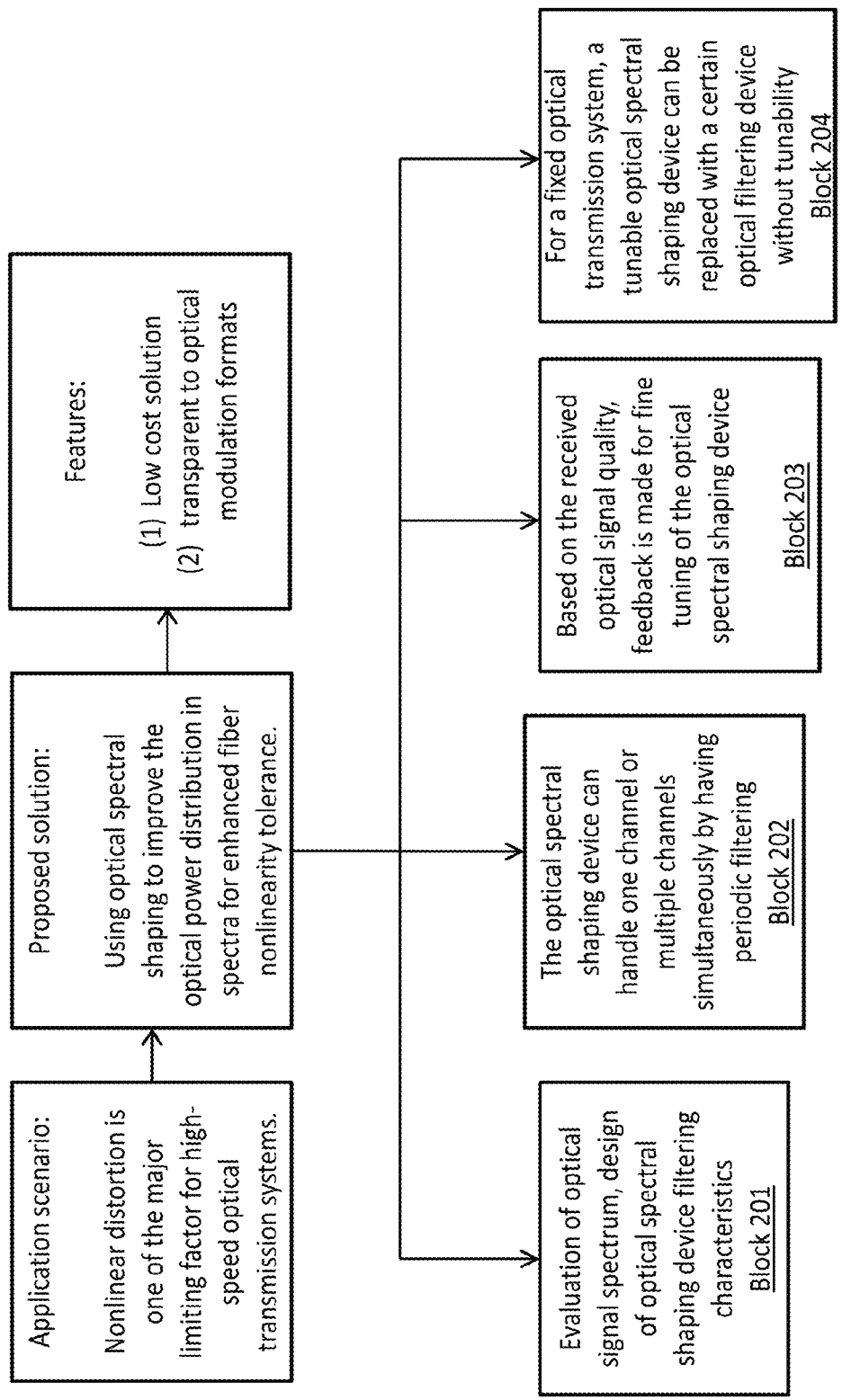
FIG. 4 shows key aspects of the inventive method for spectral shaping for improved fiber nonlinearity tolerance in an optical transmission system.

Referring now to FIG. 4, key aspects of the inventive method for optical spectral shaping in an optical transmission system are shown. In response to nonlinear distortion as a major factor in limiting high speed optical transmission systems, optical spectral shaping is used to improve the optical power distribution in spectra for enhanced fiber nonlinearity tolerance. The inventive method has the advantages of a low cost solution and is transparent to optical modulation formats.

The optical signal spectrum will be evaluated to decide estimated filtering parameters of the optical spectral filtering device 201. The filtering parameters may include periodicity, filtering notch center and depth, and dispersion, etc. The optical spectral shaping device can handle one channel or multiple channels simultaneously by having periodic filtering 202. Based on the receiver optical signal quality, feedback comments and adjustments can be made to the fine tuning of optical spectral shaping device for nonlinearity tolerance enhancement 203. A tunable optical spectral shaping device can be used to find optimal filtering characteristics for a fixed optical transmission system 204. Once the optimal filtering characteristics is identified, a fixed optical filtering device can be used for lower system cost.

From the foregoing, it can be appreciated that with the inventive method, optical spectral shaping can be used to improve the optical transmission system tolerance to the fiber nonlinearity. In comparison with other approaches, the inventive method has much less complexity (by using a single optical filtering device), lower cost (by using commercially available device. The device can be specifically designed for the system. One device with multiple periodic filtering characteristics can be applied for WDM channels simultaneously, transparent to the modulation format of the optical signal (e.g. DPSK, DQPSK, Dual polarization(DP)-QPSK, DP-8QAM, DP-32QAM, etc).

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. Additional information is provided in an appendix to the application entitle, "Additional Information". It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

Appendix

Additional Information

Abstract: Multi-channel Fabry-Perot filter is demonstrated for optical spectral shaping by aligning the filter notch with the optical signal spectral center. Q factor of 127Gbps DP-QPSK signal is improved by ~1.1 dB after 4320 km transmission over legacy DMF link.
OCIS codes: (060.0060) Fiber optics and optical communications; (060.1660) Coherent communications

1. Introduction

Coherent optical communication has triggered the intensive research in improving system capacity, transmission distance and spectral efficiency by using high-order modulation formats and advanced digital signal processing (DSP) techniques. Among the various modulation formats, dual-polarization (DP) quadrature phase shift-keying (QPSK) is one of the popular candidates for upgrading system capacity at 100Gb/s per channel with trans-oceanic transmission reach [1]. Instead of laying new dispersion uncompensated fiber links (which have the optimal dispersion map for digital coherent transmission systems), it is highly desirable to upgrade the widely deployed dispersion managed fiber (DMF) links to 100 Gb/s and beyond to reduce the system cost and increase the network data capacity. However, one of the challenges in digital coherent transmission over DMF links is caused by the its chromatic dispersion (CD) map, which was designed to have full CD compensation by using dispersion-compensated fiber (DCF) for analog receivers. This type of dispersion map would bring two critical issues when upgrading such system to 100G using coherent receivers: the small effective area of DCF (~25 - 40 $\mu m^2$) brings strong self-phase modulation (SPM) effects; the dispersion map does not provide large walking-off between neighboring WDM channels, thus enhancing the cross-phase modulation (XPM) impact. As a result, the 100G upgrade over legacy DMF fiber is a very challenging yet beneficial project for both system providers and network carriers [2].

With the aid of coherent receivers, enhanced DSP algorithms have been proposed to compensate for linear distortions and even fiber nonlinearity, such as SPM and XPM. Recent demonstration has shown 1.7 dB Q-factor improvement using SPM compensation and maximum likelihood sequence estimation [3]. Compared with new advanced DSP algorithms, which generally require high investment for developing new ASIC chips, innovative optics solutions can be more attractive. In this paper, we propose to use a low-cost, multi-channel Fabry-Perot (FP) filter for optical spectral shaping (OSS) by aligning the FP filter notch with the center of the optical signal spectrum, and the FP-OSS filter is shown to enhance the fiber nonlinearity tolerance of 127 Gb/s DP-QPSK transmission over legacy DMF fibers. A Q-factor improvement of 1.1 dB is achieved after 4,320 km transmission compared to the system without using FP-OSS filter.

2. Experimental Setup

Fig. 1 shows the experimental setup for evaluating the performance of FP-OSS in a legacy DMF link. Four odd and even wavelength channels were separately modulated to de-correlate the data. External cavity laser (ECL) was used for the testing channel which was located in the middle of eight WDM channels to take into account channel crosstalk. The IQ modulator was driven by 31.75 Gbaud in-phase and quadrature data streams to generate NRZ-QPSK signal, which passed through polarization multiplexer to generate 127 Gb/s DP-QPSK signal. Assuming 27% FEC overhead, the FEC correction capability requires 6.4 dB for the input signal Q-factor [4]. After combining the two independent odd and even channels through a 50GHz interleaver, an FP-OSS component was inserted for optical spectral shaping. Since FP filters have a periodic filtering curve, the periodicity of the FP-OSS is set to be the same as ITU grid channel spacing to cover multiple WDM channels. The modulated channels are coupled with 80 CW DFB lasers to be fed into the transmission testbed.

The transmission link consists of 6 spans of 73km-long DMFs, resulting in total of ~800ps/nm residual chromatic dispersion, which was compensated by a dispersion-compensating fiber (DCF) with +800ps/nm, leading to total 480 km fibers per loop. A wavelength selective switch (WSS) in the loop was used to preserve spectral flatness across C-band for ensuring equal gain for all channels. Received signal power was kept at 0 dBm throughout all the measurements. The testing channel of interest was first selected through two cascaded optical tunable filters (OTF), and then combined with a local oscillator (LO) laser in a 90° polarization-diversity hybrid, whose output signals were detected by four pairs of balanced detectors corresponding to the in-phase ($I$) and quadrature-phase ($Q$) signals in two polarization states. Two 2-channel digital storage scopes sample the photocurrents at 80 Gs/s sampling rate and 30 GHz bandwidth. The captured data was then processed offline and a series of typical DSP algorithms were conducted to recover the signal.

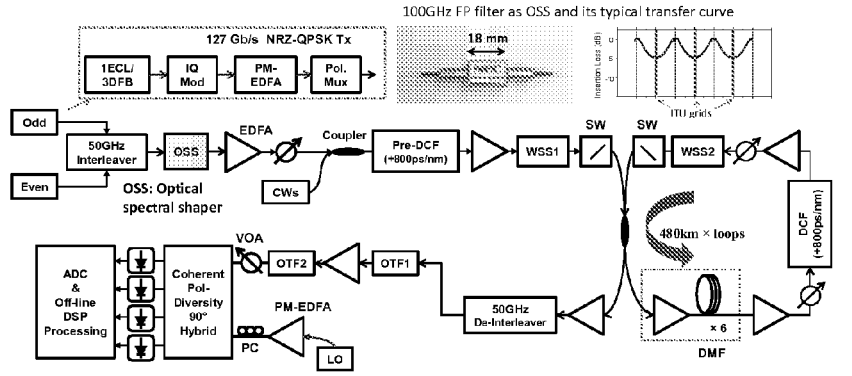

Fig. 1. Experimental setup of 127Gbps DP-QPSK transmission over DMF loops using FP optical spectral shaper (FP-OSS). ADC: analog-to-digital converter. BPF: band-pass filter; DFB: distributed feedback laser; OEQ: optical equalizer; OTF: optical tunable filter; PC: polarization controller. SW: switch; VOA: variable optical attenuator. WSS: wavelength selective switch.

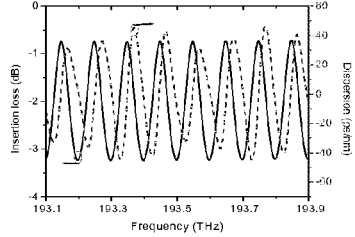

Fig. 2 Insertion loss and dispersion of the 100GHz FP-OSS filter with notch aligned to 100GHz ITU grids

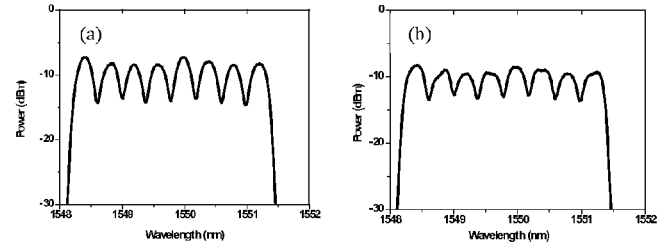

Fig. 3 Spectra of the 8WDM channels with 50GHz OSS using WaveShaper at (a) 5.4 dB and (b) 9.5 dB center notch depth ( optical spectral analyzer resolution @ 0.2 nm).

Fig. 2 shows the measured insertion loss and dispersion of the 100 GHz FP-OSS filter (shown in the inset of Fig. 1) used in the experiments. Please note that the periodic notches of the filter transfer curves match the 100GHz spacing ITU grids. In our experiments, the 8 modulated WDM channels are at 50 GHz channel spacing. When 100 GHz FP-OSS is used, the power of the 4 odd channels are adjusted so that all 8 modulated channels have the same channel power after 100 GHz FP-OSS. In order to study the system performance under different FP filterings, we further use a Finisar WaveShaper (4000S) to generate FP transfer and phase delay curves at 50 GHz and 100 GHz free spectral ranges (FSR) and different center notch depths. In practical applications, low cost FP filters can be easily designed and built with the optimal parameters from the experiments using WaveShaper emulations. Fig. 3 shows the spectra of the 8 WDM channels with 50 GHz OSS using WaveShaper. It is clear that the central notch filtering causes effective optical signal spectral broadening.

3. Results and Discussions

The measured back-to-back (BTB) Q-factor is plotted in Fig. 4 (a) against optical signal-to-noise ratio (OSNR) at 0.1 nm resolution for WDM channels with and without 100 GHz FP-OSS. The 100 GHz FO-OSS has a periodic notch depth of 3.2 dB, and the relative notch depth over the transmission peak is about 2.5 dB. Note that at least 1 million bits were used to calculate bit error rate (BER) at each point and no differential decoding was applied. The phase ambiguity was resolved by training symbols [5]. As can be observed in Fig. 4(a), the spectrum broadening resulting from OSS introduces trivial inter-channel crosstalk between 50GHz-spacing WDM channels.

Fig.4 (b) compares the performance of FP-OSS after 6 loops of DMF with the case without FP-OSS, and 0.5 dB Q-factor improvement is observed. The optimal channel power slightly shifts higher by ~0.5 dB because the wider optical signal spectrum after FP-OSS spreads the optical power more evenly, thus enhancing the fiber nonlinearity tolerance.

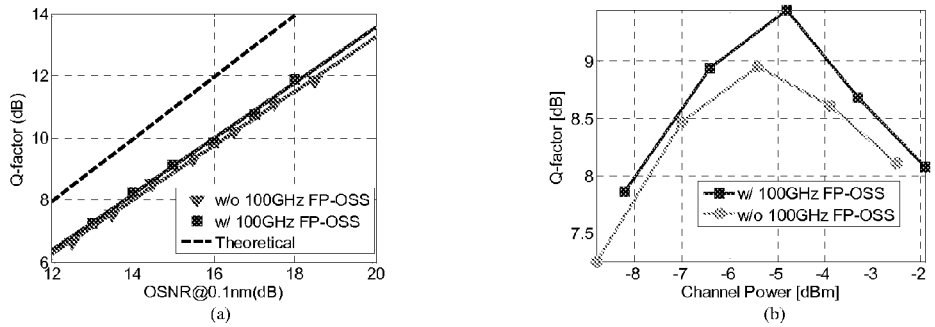

Fig. 4. (a) the measured BTB $Q$-factor of WDM channels with and without 100GHz FP-OSS;

(b) performance comparison between system with and without OEQ after 6 loops of DMF (2,880km).

To investigate the system performance at different FP filtering, we used a WaveShaper to emulate different FP filters with different notch depths at 50 GHz and 100 GHz FSRs. Fig. 5 shows the Q-factor after 6 loops of DMF at -5 dBm channel power versus the reflectivity parameter of FP filters. As the notch depth increases, the spectrum becomes broader for better mitigating the self-phase modulation (SPM) effects. The optimal notch depth is found to be around 5.4 dB (corresponding to R=0.3) which renders ~0.5 dB Q-factor improvement over no OSS case. The explanation of this improvement could be justified in both time and frequency domains. In time domain, the signal spectrum is broadened to have more interaction with chromatic dispersion, resulting in a fast-varying intensity change of the signals and averaging the nonlinear phase shift either from SPM or XPM. From the viewpoint of frequency domain, the power is spread into more evenly than the case without OSS and thus reduces the possible peak of every Fourier component [6].

Fig. 6 shows the Q-factor versus transmission distance measured in the DMF testbed. The advantage of OSS is obvious as distance increases because the fiber nonlinearity becomes the dominant factor limiting the system performance. The 50GHz OSS (using WaveShaper) can improve the signal Q factor by ~0.6 dB and ~1.1 dB, respectively, after 2,880 km and 4,320 km DMF transmissions, compared with no OSS case. The performance improvement is comparable to the SPM compensation using advanced DSP algorithm [3].

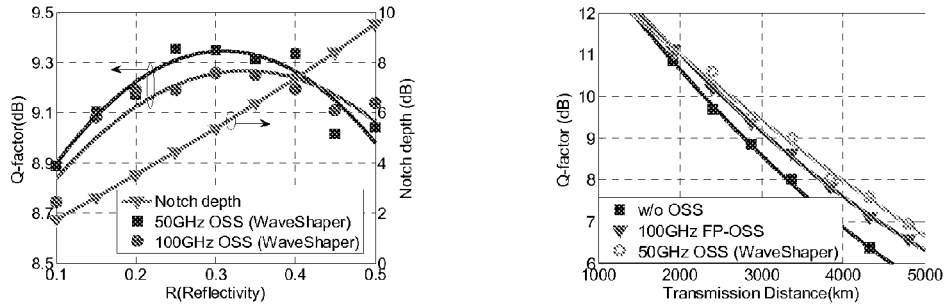

Fig. 5 the Q-factor after 6 loops of DMF at -5 dBm channel power versus the reflectivity parameter of FP filter Fig. 6 The amplitude and phase of the 100GHz FP filter with center depth of 0.35 dB; Channel power @ -4.7 dBm.

4. Conclusion

We successfully demonstrated the use of multi-channel FP filters to enhance the fiber nonlinearity tolerance of 127 Gb/s DP-QPSK over DMF link. A Q-factor improvement of 0.5dB and 1.1 dB has been observed by using 5.4 dB notch depth FP filter at 2,880 km and 4,320 km respectively.

5. References

[1] J.-X. Cai et al., Proc. OFC'11, paper PDPB4.
[2] . Renaudier et al., Proc. OFC'09, paper NWD5
[3] S. Zhang et al., submitted to OFC 2012.
[4] E. Yamazaki et al., Opt. Express 19, pp. 13179-13184 (2011)
[5] S. Zhang et al., Photon. Technol. Lett. 22, pp. 380-382 (2010)
[6] N. S. Bergano et al.,Proc' LEOS'04 workshop on advanced modulation formats, pp. 1-2 (2004)

The invention claimed is:

1. A method for using optical spectral shaping to improve optical power distribution in spectra for enhanced fiber nonlinearity tolerance in an optical transmission system, said method comprising:

evaluating an optical signal spectrum to estimate filtering parameters of an optical spectral filtering device for shaping optical signal spectrum for improved distribution of optical power among signal spectral components, said filtering parameters including filtering notch center and depth and dispersion;

determining a feedback for fine tuning said optical spectral filtering device for nonlinearity tolerance enhancement in said optical transmission system, responsive to received optical signal quality in the optical signal spectrum;

using said feedback to adjust said optical spectral filtering device for predetermined optical spectral shaping and predetermined fiber nonlinearity tolerance in said optical transmission system, said predetermined optical spectral shaping being performed by aligning an Fabry-Perot (FP) filter notch with a center of an optical signal spectrum;

configuring a fixed optical filtering device to match output filtering curves of said optical spectral filtering device adjusted by said feedback; and reducing nonlinear penalty by modifying the spectral shape of a WDM channel generated by optical transmitters by enhancing the power of high frequency spectral components using a filter having a transmittance profile designed to adjust the ratio of low and high frequency spectral components in the spectrum of the WDM channel.

2. The method of claim 1, wherein said filtering parameters further comprises periodicity.

3. The method of claim 1, wherein said optical spectral filtering device includes periodic filtering characteristics for multiple channels simultaneously.

4. The method of claim 1, wherein said optical signal spectrum comprises multiple high-speed generated optical signal in two orthogonal polarizations at different wavelengths.

5. The method of claim 4, further comprising combining multiple input channels that are directed through a single optical transmission media.

6. The method of claim 5, wherein said optical transmission media imposes nonlinear effects on said generated optical signal.

7. The method of claim 6, wherein the received signal is digitized for signal recovery in response to coherent reception of the generated optical signal.

8. The method of claim 1, wherein the filtering parameters include periodicity, wherein the spectral filtering device includes a multi-channel Fabry-Perot (FP) filter for optical spectral shaping (OSS) by aligning a FP filter notch with a center of an optical signal spectrum.

9. The method of claim 8, comprising a wave shaper to emulated different FPs.

10. The method of claim 1, comprising filters with different notch depths at 50 GHz and 100 GHz FSRs.

11. The method of claim 1, comprising using an optical spectral shaping to suppress low-frequency components of a WDM optical transmission channel to enhance fiber nonlinearity tolerance without reducing the optical signal power in an optical transmission system.

12. The method of claim 1, comprising using an optical spectral shaping to suppress low-frequency components of a so called WDM optical transmission channel in order to enhance fiber nonlinearity tolerance without reducing the optical signal power in an optical transmission system.

13. The method of claim 1, wherein the optical shaping is achieved by using a passive device.

14. The method of claim 13, wherein the passive device comprises a FP filter.

* * * * *